350-460

OR  3,975,090

United States

Lawson

[11] 3,975,090
[45] Aug. 17, 1976

[54] WIDE ANGLE OBJECTIVE

[75] Inventor: John A. Lawson, Scarborough, Canada

[73] Assignee: Optigon Research & Development Corporation, Santa Monica, Calif.

[22] Filed: July 29, 1974

[21] Appl. No.: 492,413

Related U.S. Application Data

[63] Continuation-in-part of Ser. No. 392,120, Aug. 27, 1973, abandoned.

[52] U.S. Cl................................ 350/214; 350/176; 350/255
[51] Int. Cl.² ..................... G02B 9/64; G02B 7/10
[58] Field of Search..................... 350/214, 255, 176

[56] References Cited

UNITED STATES PATENTS

| | | | |
|---|---|---|---|
| 2,503,789 | 4/1950 | Wood et al. | 350/255 |
| 3,736,049 | 5/1973 | Shimizu | 350/214 |
| R27,799 | 10/1973 | Shimizu | 350/214 |

Primary Examiner—Paul A. Sacher
Attorney, Agent, or Firm—DeLio and Montgomery

[57] ABSTRACT

A wide angle lens of the retrofocus type comprising six lens groups in front and rear groupings. The rear grouping is movable forward while the front grouping is stationary to focus the lens to within ten equivalent focal lengths of the lens.

12 Claims, 4 Drawing Figures

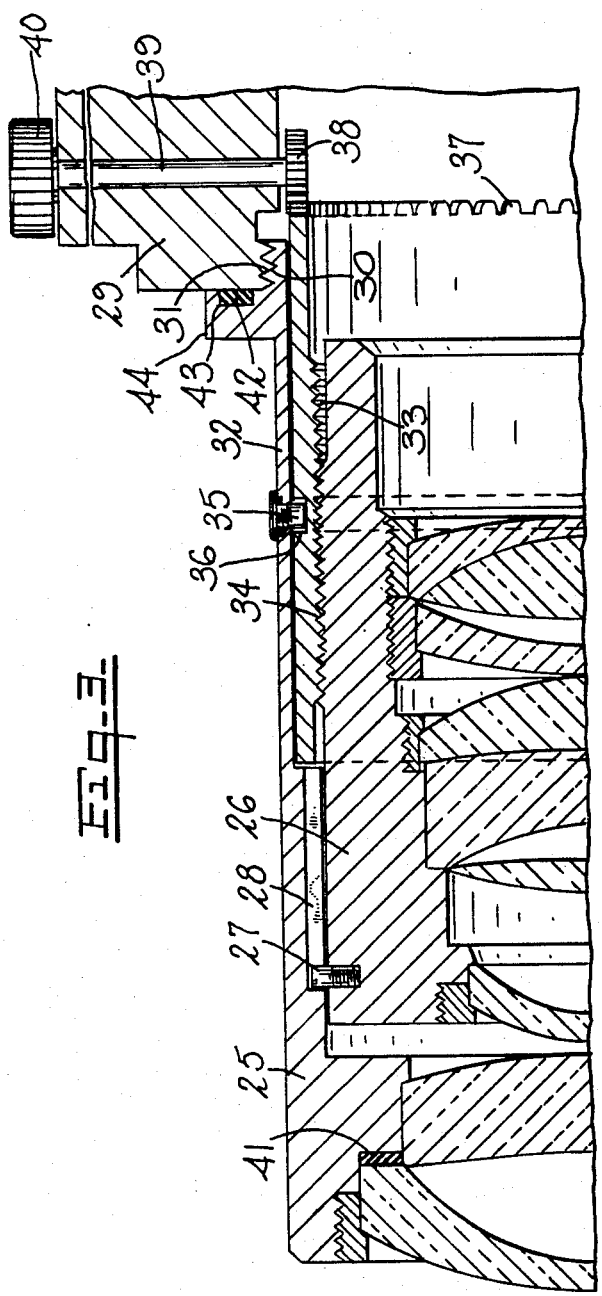

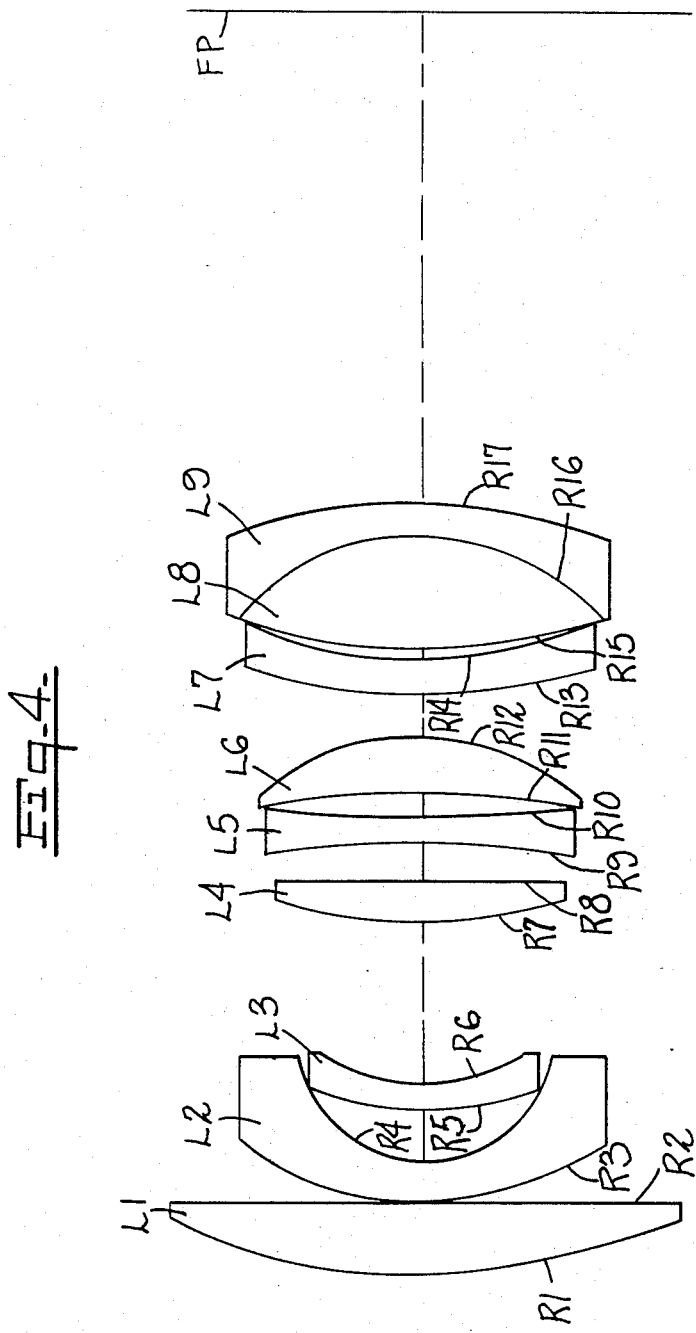

WIDE ANGLE OBJECTIVE

This application is a continuation-in-part of application Ser. No. 392,120, filed Aug. 27, 1973, now abandoned.

This invention relates to lenses and more particularly to those known as wide angle lenses.

Wide angle lenses may be defined as those in which the diameter of the film frame with which the camera is used is substantially equal to or greater than the effective focal length of the lens. Generally, wide angle objectives and particularly those of the retrofocus type are well corrected for ordinary aberrations for only one magnification. Wide angle lens of the retrofocus type are generally used with single lens reflex cameras and have a back focal length (BFL) greater than the equivalent focal length (EFL). This is generally dictated by design considerations which must permit room for the viewing mirror behind the last lens element.

Where the lens is designed for close focusing applications, the magnification will change slightly and such objectives then have considerably degraded performance due to the introduction of astigmatism, coma and other aberrations. One technique often employed to compensate for this change of aberration is to change an axial separation between lens elements as a function of focusing distance independent of focusing travel of the overall lens. While this technique has theoretical merit and can often be used to produce satisfactory results over a large range of focusing distances, the power of the lens elements for this type of objective is often large, and together with the nature of the lens element aberration contributions, the group of elements moving independent of the focusing travel is often very sensitive to deviations in mechanical centration. The resulting image is thus often degraded due to decentration more than to the effects of astigmatism, the dominant aberration due to focusing.

Accordingly, the present invention provides a new and improved wide angle lens of the retrofocus type which corrects the aberrations generally encountered in close focusing, decreases or eliminates the sensitivity to decentration resulting from focusing motion of the lens elements, and may also provide a lens barrel in which the length is not elongated during focusing. This construction may be quite useful in environments potentially damaging to the lens.

Briefly stated, the invention in one form thereof comprises a lens utilizing a front grouping of elements which are fixed in location with respect to the image plane and are generally afocal. The remaining lens elements move as a unit for focusing. since the front element grouping in combination is nearly afocal, the sensitivity to decentration resulting from the focusing motion is considerably reduced. With the proper selection of lens elements the effect of focusing the rearward group is merely to provide a constant correction for astigmatism.

An object of this invention is to provide a new and improved wide angle lens of the retrofocus type.

Another object of this invention is to provide a wide angle lens of the retrofocus type which can be focused very close distances without degradation of the image.

A further object of this invention is to provide a wide angle lens in which the front vertex distance of the lens does not change during focusing.

The features of the invention which are believed to be novel are particularly pointed out and distinctly claimed in the concluding portion of this specification. However, the invention both as to its organization and operation, together with further objects and advantages thereof, may best be appreciated by reference to the following detailed description taken in conjunction with the drawings, wherein:

FIG. 3 is a side elevation, partially in half section of another lens utilizing the invention; and FIG. 4 is a representation of another lens embodying the invention.

Figure 1:
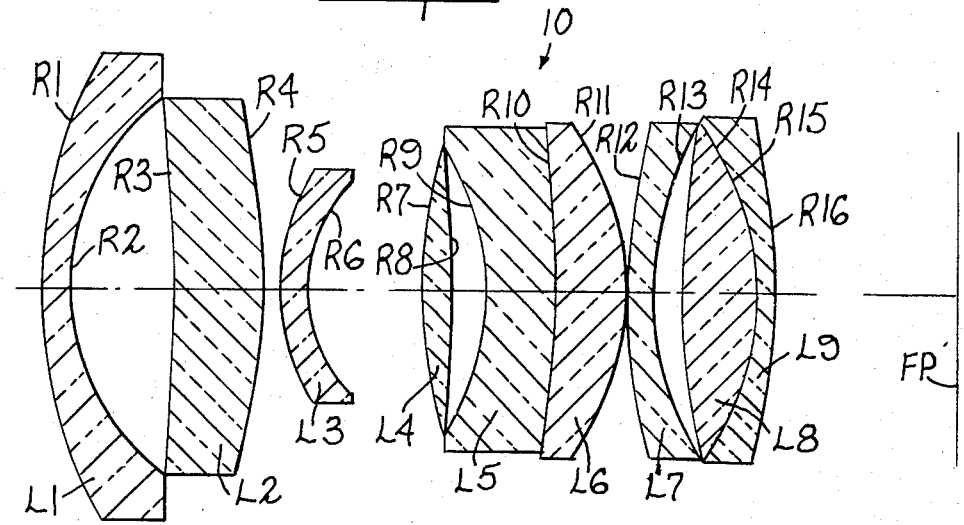
FIG. 1 is a representation of elements of a first lens embodying the invention.

Reference is now made to FIG. 1 which exemplifies a wide angle lens of the retrofocus type adapted to be utilized with a 35 millimeter camera (24 millimeter × 36 millimeter frame size) and which has a relative aperture of f/1.9 and an equivalent focal length (EFL) of 28 millimeters.

The lens 10 comprises elements L1 – L9 having surfaces defined by radii R1 – R16 as shown. The aperture is placed between elements L3 and L4. Elements L1 and L2 form a first group which is fixed in relation to a lens housing and, hence, the film plane FP. The elements L3 – L9 are held in fixed relation to each other but move axially for focusing.

The lens of FIG. 1 comprises from the object end a first negative group L1, L2; a second negative group L3 in the form of a meniscus having a convex object side surface; a third positive group L4 having a convex object side surface; a fourth positive group L5, L6 having a convex image side surface; a fifth negative group L7; and a sixth positive group L8, L9 having convex object and image side surfaces.

The lens of FIG. 1 for the frame size specified is defined substantially by the data of Table I, as scaled to an equivalent focal length of 28.7mm;

TABLE I

| Lens | Radius | Axial Distance Between Surfaces | N d | V d |
|---|---|---|---|---|
| L1 | R1  38.387mm | 2.435mm | 1.5168 | 64.2 |
|    | R2  18.755 | 8.5083 | | |
| L2 | R3  −119.389 | 7.167 | 1.7995 | 42.3 |
|    | R4  −52.877 | 4.00 | | |
| L3 | R5  18.178 | 2.180 | 1.5831 | 59.5 |
|    | R6  12.456 | 9.369 | | |
| L4 | R7  49.0379 | 2.159 | 1.8306 | 36.5 |
|    | R8  −123.776 | 2.581 | | |
| L5 | R9  −22.141 | 6.000 | 1.7470 | 27.5 |
|    | R10 −109.562 | | | |
| L6 | R11 −21.131 | 5.774 | 1.7620 | 40.3 |
|    | | 0.135 | | |
| L7 | R12 55.725 | 2.454 | 1.8467 | 23.8 |
|    | R13 26.386 | 2.239 | | |
| L8 | R14 76.751 | 6.000 | 1.8042 | 46.5 |
|    | R15 −22.374 | | | |
| L9 | | 1.500 | 1.8052 | 25.5 |
|    | R16 −54.363 | | | |

TABLE I-continued

| Lens | Radius | Axial Distance Between Surfaces | $N_d$ | $V_d$ |
|------|--------|-------------------------------|-------|-------|
|      |        | 41.687                        |       |       |

Film Plane
EFL = 28.7mm
The aperture stop is located between elements L3 and L4. The focal length of elements L1 and L2 is −329.5mm, or nearly twelve times the EFL of the lens. The spacing between elements L2 and L3 varies from 0.20mm to 4.72mm for focusing from infinity to 178.4mm. $N_d$ is the index of refraction and $V_d$ is the Abbe number.

The lens disclosed may, of course, be scaled for other image frame sizes and EFL.

Figure 2:
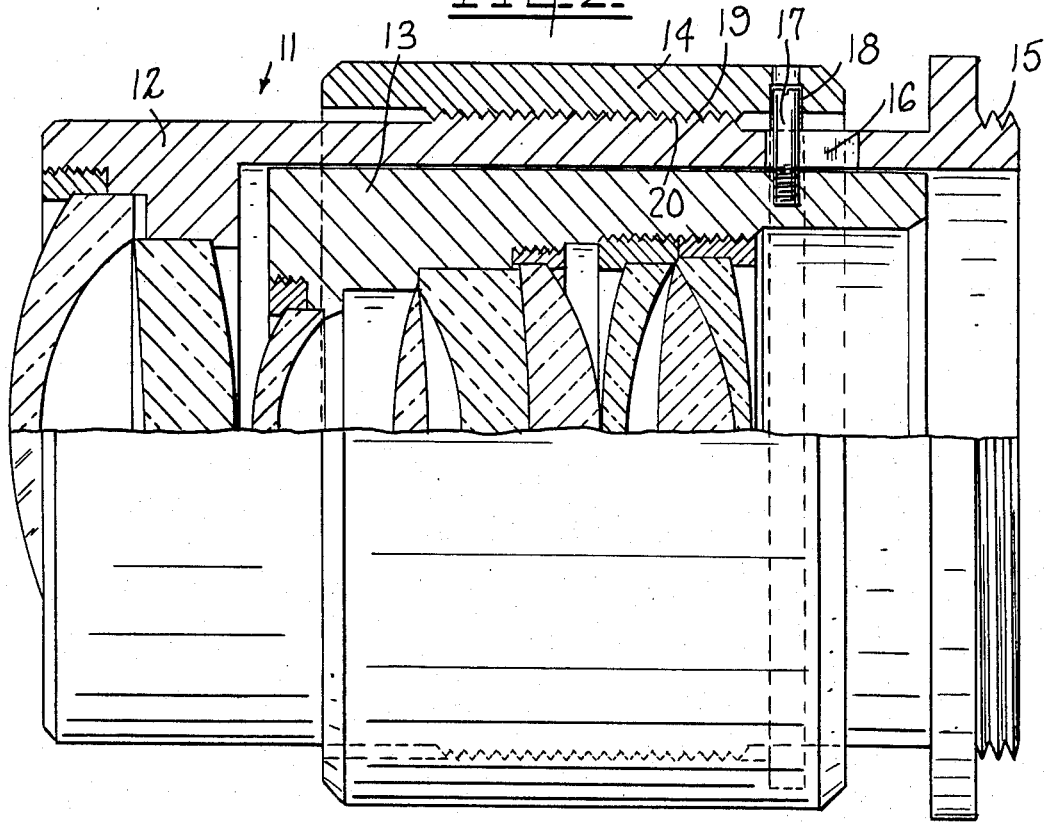
FIG. 2 is a side elevation, partially in half section of a lens utilizing the elements of FIG. 1.

FIG. 2 exemplifies the lens 10 of FIG. 1 in a lens mount 11 which includes a lens barrel or housing 12, a lens mount 13, and a focusing ring 14. Barrel 12 is provided with a camera mount in the form of threads 15, and has a longitudinal slot 16 defined therein. A pin 17 is received in mount 13 and extends through slot 16 into barrel 12 into an annular groove 18 in ring 14. Ring 14 has internal threads 19 engaging mating external threads 20 on barrel 12. As ring 14 is rotated, pin 17 in slot 16 inhibits rotation of mount 13, and axial movement is imparted to mount 13 for focusing travel.

FIG. 3 exemplifies a sealed lens construction, where there is no change in the front vertex distance of the lens during focusing. The first group comprising elements L1 and L2 is fixed in a lens barrel on housing 25, a movable lens mount 26 carrying a pin 27 therein which extends into an internal axially directed slot 28 in barrel 25. The image end of the barrel 25 is adapted to be coupled to a camera body 29 as by means of threads 30, mating with mounting threads 31 of the camera body. A focusing sleeve 32 is disposed within barrel 25, and has internal threads 33 engaging external threads 34 on mount 26. A pin 35 carried by barrel 25 extends into an annular groove 36 in sleeve 26 and prevents axial motion thereof. A gear 37 is defined on the end of sleeve 26, and meshes with a pinion 38 on a shaft 39 journaled in body 29. A focusing knob 40 is coupled to shaft 39.

To focus the lens, knob 40 is rotated imparting rotational movement to pinion 38 and sleeve 37. As sleeve 32 rotates, mount 26 travels axially in barrel 25 over the focusing range of the lens.

The barrel 25 has a continuous uninterrupted outer surface with the exception of an aperture for pin 35, which may be suitably sealed. A seal 41 may be provided between the rear side of lens element L1 and barrel 35. Also a seal 42 may be provided in an annular groove 43 in mounting flange 44 on barrel 25.

This construction provides a sealed lens which may be utilized in underwater applications without the necessity of placing the camera body and lens in a sealed container.

Table II sets forth data of another lens embodying the invention as scaled to an equivalent focal length of 35mm for a 24 × 36mm frame size, and with a relative aperture of F/1.9. The lens of Table II is exemplified in FIG. 4.

TABLE II

| Lens | | Radius(mm) | Axial Distance Between Surfaces(mm) | $N_d$ | $N_d$ |
|------|---|-----------|-----|-------|-------|
| L1 | $R_1$ | 30.600 | | | |
|    |       |        | 7.000 | 1.487 | 70.4 |
|    | $R_2$ | 170.290 | | | |
|    |       |        | .300 | | |
|    | $R_3$ | 34.231 | | | |
| L2 |       |        | 2.985 | 1.487 | 70.4 |
|    | $R_4$ | 11.567 | | | |
|    |       |        | 6.000 | | |
|    | $R_5$ | 67.235 | | | |
| L3 |       |        | 2.000 | 1.569 | 56.0 |
|    | $R_6$ | 25.201 | | | |
|    |       |        | 6.171 | | |
|    | $R_7$ | 46.077 | | | |
| L4 |       |        | 3.200 | 1.806 | 40.7 |
|    | $R_8$ | −644.608 | | | |
|    |       |        | 7.931 | | |
|    | $R_9$ | −34.424 | | | |
| L5 |       |        | 2.358 | 1.762 | 26.6 |
|    | $R_{10}$ | −829.911 | | | |
|    |       |        | 1.350 | | |
|    | $R_{11}$ | −47.763 | | | |
| L6 |       |        | 4.832 | | |
|    | $R_{12}$ | −19.289 | | | |
|    |       |        | 4.70−.10 | 1.757 | 47.7 |
|    | $R_{13}$ | 41.514 | | | |
| L7 |       |        | 3.000 | 1.667 | 33.1 |
|    | $R_{14}$ | 35.544 | | | |
|    |       |        | 1.900 | | |
|    | $R_{15}$ | 64.725 | | | |
| L8 |       |        | 8.000 | 1.717 | 48.0 |
|    | $R_{16}$ | −22.414 | | | |
| L9 |       |        | 2.700 | 1.805 | 25.5 |
|    | $R_{17}$ | −56.648 | | | |

The BFL varies from 39.56mm to 44.16mm as the lens is focused from infinity to 258mm, and the spacing between Groups IV and V varies as shown. The aperture stop is located 1.59mm behind element L4. Groups I-IV are fixed with respect to the film plane.

In this arrangement only the grouping of elements L7, L8 and L9 move while the grouping of elements L1 – L6 as shown in FIG. 4 are stationary in the lens housing. There is thus no change in the front vertex distance and the lens barrel may be completely sealed.

Table III exemplifies a lens also as represented in FIG. 4 as scaled for a 28.5mm equivalent focal length for a 24 × 36mm image frame in which the grouping elements L7, L8 and L9 move relative to the image frame while the grouping of elements L1 – L6 are in fixed relation to the image frame and there is no change in the front vertex distance of the lens when focused as close as 203mm or 7.25 EFL's.

TABLE III

| Lens | | Radius(mm) | Axial Distance Between Surfaces(mm) | $N_d$ | $V_d$ |
|------|---|-----------|-----|-------|-------|
| L1 | $R_1$ | 54.600 | | | |
|    |       |        | 5.700 | 1.487 | 70.4 |
|    | $R_2$ | 937.48 | | | |
|    |       |        | .300 | | |
|    | $R_3$ | 28.640 | | | |
| L2 |       |        | 2.800 | 1.487 | 70.4 |
|    | $R_4$ | 11.392 | | | |
|    |       |        | 4.474 | | |
|    | $R_5$ | 28.640 | | | |
| L3 |       |        | 2.000 | 1.517 | 64.2 |
|    | $R_6$ | 15.990 | | | |
|    |       |        | 13.502 | | |
|    | $R_7$ | 41.450 | | | |
| L4 |       |        | 3.200 | 1.689 | 31.2 |
|    | $R_8$ | 840.70 | | | |
|    |       |        | 3.342 | | |
|    | $R_9$ | −70.750 | | | |
| L5 |       |        | 2.164 | 1.805 | 25.5 |
|    | $R_{10}$ | 106.030 | | | |
|    |       |        | 1.900 | | |
|    | $R_{11}$ | −71.649 | | | |
| L6 |       |        | 4.549 | 1.804 | 46.5 |
|    | $R_{12}$ | −21.220 | | | |
|    |       |        | 4.098 −.10 | | |
|    | $R_{13}$ | 48.140 | | | |
| L7 |       |        | 2.700 | 1.741 | 27.8 |
|    | $R_{14}$ | 35.430 | | | |
|    |       |        | 1.212 | | |
|    | $R_{15}$ | 53.960 | | | |
| L8 |       |        | 9.159 | 1.639 | 55.5 |

TABLE III-continued

| Lens | | Radius(mm) | Axial Distance Between Surfaces(mm) | $N_d$ | $V_d$ |
|---|---|---|---|---|---|
| L9 | $R_{16}$ | −20.430 | 2.700 | 1.805 | 25.5 |
| | $R_{17}$ | −44.190 | | | |

The aperture stop is located 11.5mm behind L3. Groups V and VI move from a BFL of 39.2mm to 43.2mm for focusing from infinity to 203mm while Groups I –IV are fixed with respect to the film plane.

The lens groupings of the lenses are set forth in Table IV.

TABLE IV

| Lens Table | Stationary Grouping | Movable Grouping |
|---|---|---|
| I | L1, L2 | L3 – L9 |
| II | L1 – L6 | L7 – L9 |
| III | L1 – L6 | L7 – L9 |

The absolute value of the EFL ($F_s$) of the stationary grouping is is substantially greater than the EFL ($F_o$) of the overall lens, the EFL of the stationary grouping being at least three times the focal length of the overall lens or $$|F_s| \geq 3F_o$$

It is preferred that the following relations are maintained:

$$3.7 F_o \geq F_{56} \geq 1.5 F_o$$

where $F_o$ is the EFL of the lens and $F_{56}$ is the combined equivalent focal length of Groups V and VI, and $$1.5 F_o \geq F_{34} \geq 1.0 F_o$$

where $F_{34}$ is the combined equivalent focal length of Groups III and IV.

The disclosed lens have the following relationships:

| LENS | $F_s/F_o$ | $F_{56}/F_o$ | $F_{34}/F_o$ | Focuses To | |
|---|---|---|---|---|---|
| Table I | −11.54 | 3.61 | 1.26 | $6.20F_o$ | (7.01″) |
| Table II | 4.89 | 1.57 | 1.31 | $7.12F_o$ | (10.15″) |
| Table III | 3.19 | 2.18 | 1.46 | $7.25F_o$ | (7.99″) |

It is possible to focus even closer by moving the overall lens after the movable grouping has reached the end of its travel. This is merely a conjugate shift, which is accomplished after the primary focusing movement.

For example the lens of Table III can be arranged so that after L7-L9 move forward from an object distance of infinity to an object distance 209mm (8.23 EFL) through 3.9mm of forward travel, the entire lens may be moved 1.3mm to focus to an object distance 149.7mm or 5.89 EFL. This may easily be accomplished mechanically by making movement of the overall lens responsive to the moving group reaching the end of its close focusing travel.

The described arrangements provide wide angle lens of the retrofocus type which give excellent image quality while focusing to less than 10 EFL's from the front element and capable of focusing within 8 EFL's while maintaining a relatively small front vertex distance.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A wide angle lens of the retrofocus type comprising a housing, said housing having means for detachable mounting to a camera, a plurality of lens groups in said housing comprising from the object end to the image end, a first negative group, a second negative group in the form of a meniscus having a convex object side surface, a third positive group having a convex object side surface, a fourth positive group having a convex image side surface, a fifth negative group, and a sixth positive group having convex image and object side surfaces, said lens groups arranged in said housing in first and second groupings, said first grouping including said first group and mounted in said housing in fixed relation thereto, said second grouping residing on the image side of said first grouping and being of positive overall power, means for moving said second grouping with all groups therein in said housing in fixed relation to each other toward said first grouping while said first grouping remains stationary in said housing to focus said lens to within ten equivalent focal lengths of said lens.

2. The lens of claim 1 wherein said second grouping comprises said second, third, fourth, fifth and sixth groups.

3. The lens of claim 1 wherein said second grouping comprises said fifth and sixth groups.

4. The lens of claim 1 wherein $$1.5 F_o \geq F_{34} \geq 1.2 F_o$$

where $F_{34}$ is the combined equivalent focal length of the third and fourth groups and $F_o$ is the equivalent focal length of the overall lens.

5. The lens of claim 1 wherein $$3.7 F_o \geq F_{56} \geq 1.5 F_o$$

where $F_{56}$ is the combined equivalent focal length of the fifth and sixth groups and $F_o$ is the equivalent focal length of the overall lens.

6. The lens of claim 1 defined substantially by the following data where the elements L1 and L2 comprise said first grouping:

| Lens | | Radius(mm) | Axial Distance Between Surfaces(mm) | $N_d$ | $V_d$ |
|---|---|---|---|---|---|
| L1 | R1 | 38.387mm | 2.435mm | 1.5168 | 64.2 |
| | R2 | 18.755 | 8.5083 | | |
| L2 | R3 | −119.389 | 7.167 | 1.7995 | 42.3 |
| | R4 | −52.877 | 4.00 | | |
| L3 | R5 | 18.178 | 2.180 | 1.5831 | 59.5 |
| | R6 | 12.456 | 9.369 | | |
| L4 | R7 | 49.0379 | 2.159 | 1.8306 | 36.5 |
| | R8 | −123.776 | 2.581 | | |

-continued

| Lens | | Radius(mm) | Axial Distance Between Surfaces(mm) | $N_d$ | $V_d$ |
|---|---|---|---|---|---|
| L5 | R9 | −22.141 | | | |
| | | | 6.000 | 1.7470 | 27.5 |
| L6 | R10 | −109.562 | | | |
| | | | 5.774 | 1.7620 | 40.3 |
| | R11 | −21.131 | | | |
| | | | 0.135 | | |
| L7 | R12 | 55.725 | | | |
| | | | 2.454 | 1.8467 | 23.8 |
| | R13 | 26.386 | | | |
| | | | 2.239 | | |
| L8 | R14 | 76.751 | | | |
| | | | 6.000 | 1.8042 | 46.5 |
| | R15 | −22.374 | | | |
| L9 | | | 1.500 | 1.8052 | 25.5 |
| | R16 | −54.363 | | | | where L1—L9 are lens elements from the object to the image end, R1–R16 are the radii of the surfaces of the lens elements, $N_d$ is the index of refraction and $V_d$ is the Abbe number of elements L1–L9.

7. The lens of claim 1 defined substantially by the following data:

| Lens | | Radius(mm) | Axial Distance Between Surfaces(mm) | $N_d$ | $N_d$ |
|---|---|---|---|---|---|
| L1 | R1 | 30.600 | | | |
| | | | 7.000 | 1.487 | 70.4 |
| | R2 | 170.290 | | | |
| | | | .300 | | |
| L2 | R3 | 34.231 | | | |
| | | | 2.985 | 1.487 | 70.4 |
| | R4 | 11.567 | | | |
| | | | 6.000 | | |
| L3 | R5 | 67.235 | | | |
| | | | 2.000 | 1.569 | 56.0 |
| | R6 | 25.201 | | | |
| | | | 6.171 | | |
| L4 | R7 | 46.077 | | | |
| | | | 3.200 | 1.806 | 40.7 |
| | R8 | −644.608 | | | |
| | | | 7.931 | | |
| L5 | R9 | −34.424 | | | |
| | | | 2.358 | 1.762 | 26.6 |
| | R10 | −829.911 | | | |
| | | | 1.350 | | |
| L6 | R11 | −47.763 | | | |
| | | | 4.832 | | |
| | R12 | −19.289 | | | |
| | | | 4.70 − .10 | 1.757 | 47.7 |
| L7 | R13 | 41.514 | | | |
| | | | 3.000 | 1.667 | 33.1 |
| | R14 | 35.544 | | | |
| | | | 1.900 | | |
| L8 | R15 | 64.725 | | | |
| | | | 8.000 | 1.717 | 48.0 |
| | R16 | −22.414 | | | |
| L9 | | | 2.700 | 1.805 | 25.5 |
| | R17 | −56.648 | | | | where L1–L9 are lens elements from the object to the image end, R1–R17 are the radii of the surfaces of the lens elements, $N_d$ is the index of refraction and $V_d$ is the Abbe number of elements L1–L9.

8. The lens of claim 1 defined substantially by the following data:

| Lens | | Radius(mm) | Axial Distance Between Surfaces(mm) | $N_d$ | $V_d$ |
|---|---|---|---|---|---|
| L1 | R1 | 54.600 | | | |
| | | | 5.700 | 1.487 | 70.4 |
| | R2 | 937.48 | | | |
| | | | .300 | | |
| L2 | R3 | 28.640 | | | |
| | | | 2.800 | 1.487 | 70.4 |
| | R4 | 11.392 | | | |
| | | | 4.474 | | |
| L3 | R5 | 28.640 | | | |
| | | | 2.000 | 1.517 | 64.2 |
| | R6 | 15.990 | | | |
| | | | 13.502 | | |
| L4 | R7 | 41.450 | | | |
| | | | 3.200 | 1.689 | 31.2 |
| | R8 | 840.70 | | | |
| | | | 3.342 | | |
| L5 | R9 | −70.750 | | | |
| | | | 2.164 | 1.805 | 25.5 |
| | R10 | 106.030 | | | |
| | | | 1.900 | | |
| L6 | R11 | −71.649 | | | |
| | | | 4.549 | 1.804 | 46.5 |
| | R12 | −21.220 | | | |
| | | | 4.098 − .10 | | |
| L7 | R13 | 48.140 | | | |
| | | | 2.700 | 1.741 | 27.8 |
| | R14 | 35.430 | | | |
| | | | 1.212 | | |
| L8 | R15 | 53.960 | | | |
| | | | 9.159 | 1.639 | 55.5 |
| | R16 | −20.430 | | | |
| L9 | | | 2.700 | 1.805 | 25.5 |
| | R17 | −44.190 | | | | where L1–L9 are lens elements from the object to the image end, R1–R17 are the radii of the surfaces of the lens elements, $N_d$ is the index of refraction and $V_d$ is the Abbe number of elements L1–L9.

9. A wide angle lens of the retrofocus type comprising from the object end a first negative group, a second negative group in the form of a meniscus, a third positive group having a convex object side surface, a fourth positive group having a convex image side surface, a fifth negative group in the form of a meniscus having a concave image side surface, a sixth positive group having convex object and image side surfaces, said lens groups arranged in front and rear groupings with said rear grouping of positive power, said rear grouping being movable forwardly a predetermined distance toward said front grouping while said front grouping is held stationary to focus said lens to within ten equivalent focal lengths of the first element of said lens, said front and rear groups being movable toward an object in fixed relation after said predetermined movement of said rear grouping.

10. The lens of claim 9 wherein said second grouping comprises said fifth and sixth groups.

11. The lens of claim 9 wherein $$1.5 F_o \geq F_{34} \geq 1.2 F_o$$

where $F_{34}$ is the combined equivalent focal length of the third and fourth groups and $F_o$ is the equivalent focal length of the overall lens.

12. The lens of claim 10 wherein $$3.7 F_o \geq F_{56} \geq 1.5 F_o$$

where $F_{56}$ is the combined equivalent focal length of the fifth and sixth groups and $F_o$ is the equivalent focal length of the overall lens.

* * * * *